APPARATUS FOR HANDLING MOLD CHARGES OF MOLTEN GLASS

Original Filed Nov. 9, 1967 3 Sheets-Sheet 1

APPARATUS FOR HANDLING MOLD CHARGES OF MOLTEN GLASS

Original Filed Nov. 9, 1967 3 Sheets-Sheet 2

APPARATUS FOR HANDLING MOLD CHARGES OF MOLTEN GLASS

Original Filed Nov. 9, 1967 3 Sheets-Sheet 3

United States Patent Office

Re. 28,073
Reissued July 9, 1974

28,073

APPARATUS FOR HANDLING MOLD CHARGES OF MOLTEN GLASS

Urban P. Trudeau, Toledo, Ohio, assignor to Owens-Illinois, Inc.

Original No. 3,597,187, dated Aug. 3, 1971, Ser. No. 681,651, Nov. 9, 1967. Application for reissue Aug. 1, 1973, Ser. No. 384,564
Int. Cl. C03b *5/32*
U.S. Cl. 65—304 10 Claims

Matter enclosed in heavy brackets [ ] appears in the original patent but forms no part of this reissue specification; matter printed in italics indicates the additions made by reissue.

ABSTRACT OF THE DISCLOSURE

The sequential delivery of plural mold charges or gobs to a plurality of glass forming machines positioned beneath a flow feeder. A single pair of scoops, having their upper, gob-receiving ends in vertical alignment with the double orifices of the flow feeder, are pivoted horizontally under the mechanical control of a cam operated drive mechanism so as to provide a predetermined, timed sequence of delivery of gobs falling from the orifices to the gob guides and deflectors of a plurality of forming machines.

More particularly, the invention is a novel apparatus for delivering mold charges, or "gobs," of molten glass to an I.S. type machine, such for example as that forming the subject matter of Ingle Pat. 1,843,160 and/or 1,843,285, but wherein each individual section, or unit, has more than one blank or parison mold cavity to which mold charges must be delivered concurrently. In this type of machine the sections, or units, are arranged side by side in a straight row and each section is a complete bottle forming machine comprising a blank mold, neck mold and blow mold or finishing mold, together with conventional take-out means for transferring finished articles from the blow mold to a conveyor. Each blank mold has at least two side by side, upwardly opening cavities to which mold charges of molten glass are delivered by gravity.

An important object of my invention is the provision of simple, efficient apparatus for effecting simultaneous delivery by gravity, of several mold charges of molten glass to each of a plurality of the sections of an I.S. type machine, one section at a time and in a predetermined order.

A further object of my invention is the provision of a movable deflector scoop, interposed between a flow feeder, or forehearth, and inclined delivery troughs individual to the sections of an I.S. type machine, the scoop being oscillated in a horizontal plane to register its discharge end with the receiving end of successive rigid troughs leading to the blank molds of the machine sections.

Another object of my invention is the provision of plural deflector scoops interposed between the upper receiving ends of rigid inclined troughs leading to plural cavity blank molds, each such scoop having a lower discharge end for register with the upper end of a trough and an upper open receiving end beneath and coaxial with a bottom outlet of a glass feeder and intended to be oscillated on such axis thereby to register the scoops successively and in a predetermined sequence with the troughs.

It is also an object of my invention to provide a plural deflector scoop arrangement comprising two generally arcuate troughs or scoops relatively positioned at slightly different elevations and in more or less nested relationship, there being novel means for oscillating the scoops on vertical axes extending through the upper charge receiving ends of the two troughs, or scoops, with these axes in register with the axes of the bottom discharge orifices of a conventional flow feeder.

Other objects will be in part apparent and in part pointed out hereinafter.

BRIEF DESCRIPTION OF THE DRAWINGS

In the accompanying drawings forming a part of my application:

As illustrated in FIG. 1, my invention is especially adapted for use in directing mold charges or "gobs" 10 of molten glass from a flow feeder or forehearth 11 to a group of plural cavity blank molds 12, each of which is an element of a complete article fabricating section or unit of the type shown in the above-referred-to Ingle patents. Because each unit or section simultaneously produces two articles, such as bottles or jars, the feeder, of course, discharges two "gobs" concurrently. Additionally, there are pairs of inclined troughs or channels 13 having discharge ends 14 registering with the open upper end of the cavities 15 in the blank or parison molds 12. These troughs 13 are rigidly supported, substantially as shown with their gob-receiving open upper ends 17 terminating at points below and slightly forwardly of the feeder 11. Preferably, and as best indicated in FIGS. 3 and 4, these troughs at least in the upper areas, are positioned one above the other. The gob-receiving upper ends 17 of the troughs 13 terminate along arcuate paths generally concentric with and quite near the paths followed by the lower discharge ends of the scoops (FIGS. 1 and 3) thus facilitating gob transfer to the troughs. Moreover, as indicated in FIG. 3, the receiving ends of the upper set of troughs terminate short of the lower set so that the two deflector scoops 18 and 18a may be of identical shape and dimensions, in the interest of minimizing production costs, etc. If desired, however, the troughs may terminate in the same vertical plane and the scoops dimensioned accordingly. Mold charges or "gobs" 10 of molten glass fall by gravity into the flared upper receiving ends 19 of the two deflector scoops 18 and 18a, these having been brought to rest with their lower discharge ends 20 in register with a pair of the superposed troughs 13, such gobs of glass being guided by these troughs to the blank cavities 15 of the molds 12. The deflector scoops are mounted for oscillation about individual vertical axes extending through their flared upper ends 19, one each of said axes being coaxial with a feeder outlet in a bushing 16 through which molten glass issues to produce the gobs 10. These scoops are moved as a unit on their axes, preferably in the order indicated in FIGS. 1 and 5, so that removal of finished articles from the molds and transfer of same, in orderly fashion, to a machine conveyor (not shown), may be effected. Reference to the Ingle patents will clarify this point and indicate the need for timing the gob delivery substantially in keeping with the disclosure in FIGS. 1 and 5.

Figure 2:
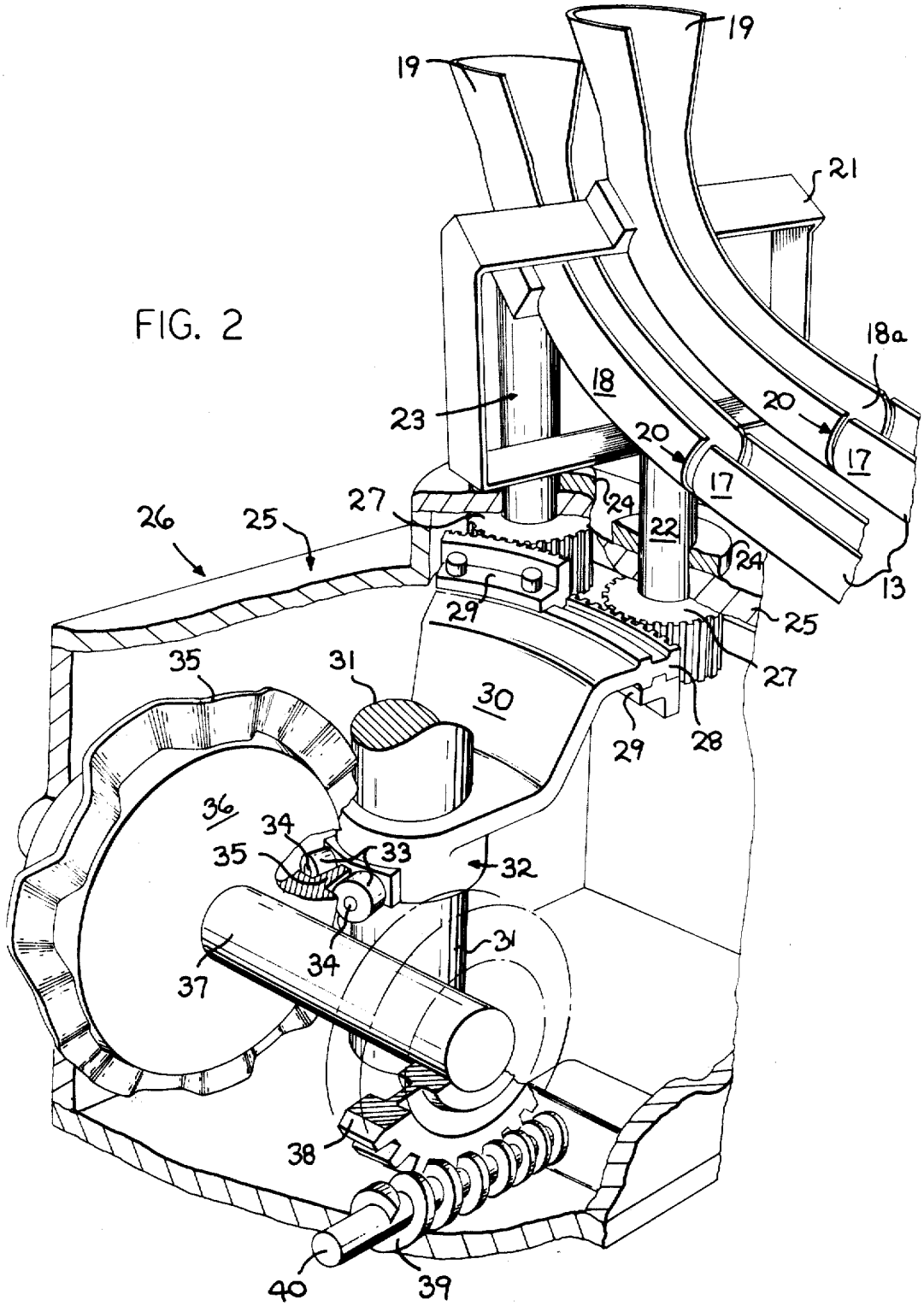
FIG. 2 is a detail perspective view, partly in section, showing the deflector scoops and mechanism for actuating them.
Figure 3:
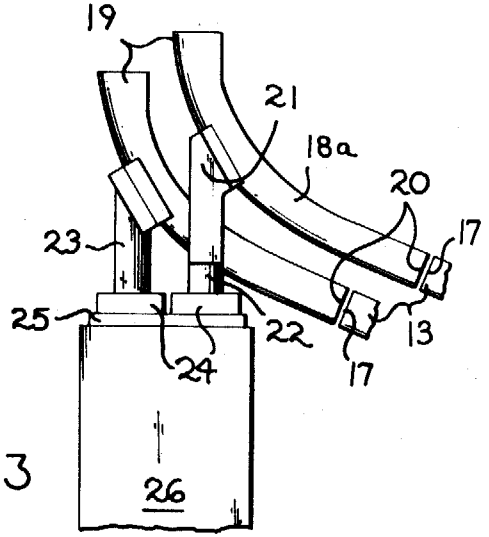
FIG. 3 is a partial side elevational view revealing the relative positioning of the two deflector scoops.
Figure 4:
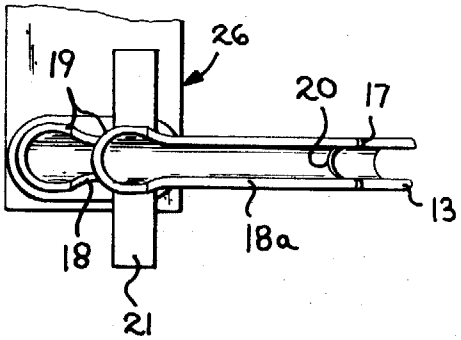
FIG. 4 is a top plan view of the parts shown in FIG. 3.

One of the deflector scoops 18a is mounted upon an open rectangular frame 21 supported on the upper end of a vertical shaft 22 (FIG. 2) while the other scoop 18 is directly connected to the upper end of a second vertical shaft 23. This other scoop 18 extends in part through the open frame 21 (FIGS. 2 and 3) and, as explained previously, is generally below the scoop 18a, so that there is adequate clearance between them to permit free unfettered oscillation of the scoops in unison. These two shafts 22 and 23 are parallel to each other and extend through bearings 24 in which they are suitably mounted, such bearings being provided in the upper wall 25 of a gear box 26. At the lower end of each shaft 22 and 23, within the gear box 26 is a pinion or gear 27, both meshing with a rockable sector gear 28. This sector gear also carries a pair of conventional toothed adjustable wear take-up blocks 29, the positions of which are changed, when necessary, to compensate for wear of the meshing teeth of the pinions 27 and sector gear 28 and consequent improper gear to pinion contact.

This sector gear 28 is mounted upon a generally triangular holder 30 which in turn is secured to a vertical shaft 31, this shaft being enclosed in the housing 26. A collar 32 which connects the holder 30 to the shaft carries a pair of rollers 33 mounted on stub shaft 34 extending radially from said collar in relatively close circumferentially spaced apart, relationship. These rollers 33 engage opposed sides of a continuous web-cam 35 provided along the periphery of a carrier disk 36 which is mounted upon a horizontal shaft 37. At one end this horizontal shaft 37 carries a worm gear 38 meshing with and driven by a worm 39. A shaft 40 carrying this worm 39 is driven by a motor 41.

Figure 1:
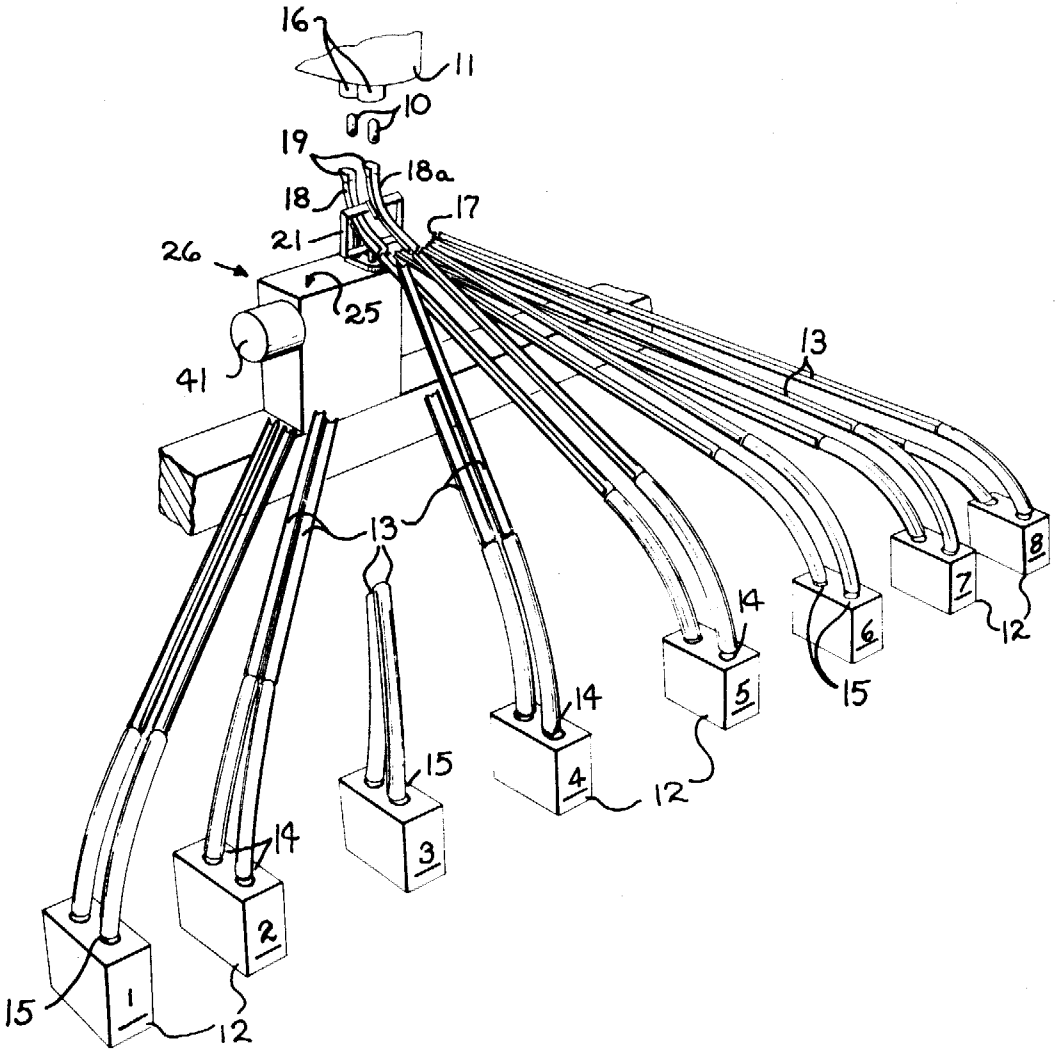
FIG. 1 is a perspective view showing my invention in association with an eight-section, I.S. type machine, the blank molds, only being shown. These blank molds, except that they are of double-cavity form, are similar to those identified by the numeral 1 in FIG. 1 of Ingle Pat. No. 1,843,285.
Figure 5:
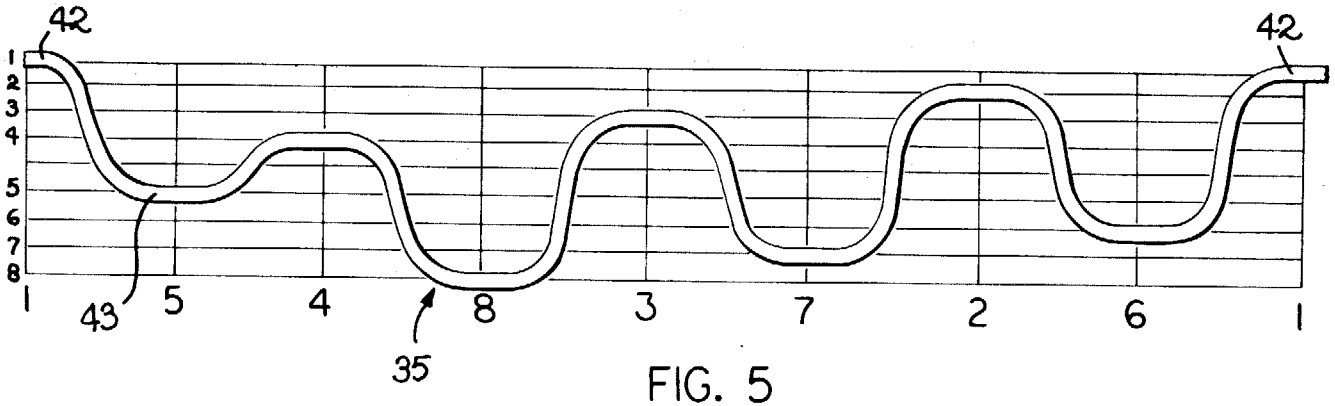
FIG. 5 is a generated, plan view of the web-cam 35 of FIG. 2 and illustrates the sequence of delivery of mold charges to the eight sections of an I.S. machine.

The contour of the web-cam 35 reflects the sequence of operation of the bottle forming sections or units and defines the specific cycle of gobs delivery and the position of the deflector scoops 18 and **18*a* at any given time. When viewing FIGS. 1 and 5, it can be seen that as the cam 35 rotates, it will move the scoops 18 and 18a so as to position their delivery ends to sequentially deliver gobs to the forming sections in the order indicated in FIG. 5. Specifically, this firing order will be 1, 5, 4, 8, 3, 7, 2, 6 and 1 again. The dwell period defined by the portion of the cam designated 42 in FIG. 5, positions the scoops to deliver the pair of gobs to the forming section, No. 1 of FIG. 1. Following this operation the cam shifts the rollers 33 to the dwell portion 43 of the cam and moves the sector gear 28** so as to position the two scoops for delivery of two gobs to the blank mold of number 5 section. This continues through one complete revolution of the web-cam, whereupon all sections will have completed a forming cycle and the sequence of operations will be repeated.

Modifications may be resorted to within the spirit and scope of the appended claims.

I claim:

1. In combination with a molten glass feeder having a plurality of bottom outlet orifices from which separate mold charges are discharged simultaneously, of means for distributing charges for delivery by gravity to plural cavity blank molds of a series of forming machines, said distributing means comprising, sets of plural, fixed inclined troughs, a set of said troughs being provided for each said forming machine, each said set of troughs extending downwardly from a point near the feeder to a position immediately above the mold cavities of its respective forming machine, each said set having troughs corresponding in number to the numbers of cavities in its respective plural cavity blank mold of its respective machine, plural mold charge deflector scoops, said scoops being equal in number to said orifices and said cavities of the plural cavity blank molds, means for supporting said scoops in a position such that each scoop extends from beneath one of said orifices and is movable selectively into alignment with one of the troughs of a set of said troughs, the upper end of each said scoop being at all times in substantially coaxial alignment with and beneath its respective orifice, and means for oscillating said scoops in step-by-step fashion while maintaining the upper ends thereof in alignment with their respective orifices and moving their lower ends to register their lower ends in predetermined order with the upper ends of said sets of troughs.

2. Apparatus for simultaneously distributing a pair of mold charges being fed from a double orifice glass feeder to the double cavity blank molds of a plurality of glass forming machines comprising a pair of elongated, curved deflector scoops, means supporting said scoops in generally side-by-side relationship, each said scoop being formed with an open, upwardly facing receiving end in coaxial alignment with one of the feeder orifices only and a lower end, driven cam means, and rack and pinion drive means interconnecting said cam means and scoops whereby the upper end of each said scoop is maintained at all times in substantial coaxial alignment with and beneath its respective orifice, and each said scoop is oscillated in response to movement of said cam means to move the lower ends of said scoops into positions to distribute pairs of charges selectively to the forming machines.

3. The apparatus as defined in claim 1 wherein the individual troughs of each set of troughs are mounted with their mold charge receiving ends at vertically spaced points and the means for supporting each scoop positions the scoop with its lower end in the same horizontal plane as one of the troughs of each set of troughs.

4. The apparatus as defined in claim 1, wherein said means supporting said scoops comprises a vertical shaft connected to each scoop with its axis coaxial with respect to the axis of the receiving end of the scoop and its corresponding orifice.

5. The apparatus as defined in claim 1, wherein said means for oscillating said scoops in unison comprises pinion means carried by each scoop, rack means engageable with said pinion means for effecting simultaneous oscillation of said scoops and means for reciprocating said rack.

6. The apparatus as defined in claim 4, further including pinions mounted on said shafts, and said means for oscillating said scoops comprises a driven sector gear coupled to said pinions.

7. The apparatus as defined in claim 5, wherein said rack is in the form of a gear sector and said means for reciprocating said rack comprises a continuous cam, means for rotating said cam and means coupling said cam to said rack for oscillatory movement in response to the shape of said cam.

8. The apparatus of claim 7, wherein said cam comprises a radially extending web mounted on the periphery of a disc and said means coupling the cam to the rack comprises a pair of rollers mounted on said rack with the rollers embracing the web of said cam.

9. The apparatus as defined in claim 2, wherein said rack and pinion drive means comprises separate vertical shafts supporting said scoops, a pinion mounted on each shaft and a rack in simultaneous engagement with both pinions, and cam follower means carried by said rack in engagement with said cam means.

*10. In combination with a molten glass feeder having a plurality of closely spaced bottom outlet orifices from which separate mold charges are discharged simultaneously, of means for distributing charges for delivery by gravity to plural cavity blank molds of a series of forming machines, said distributing means comprising, sets of plural, fixed inclined troughs having their upper ends in closely spaced array near said feeder, a set of said troughs being provided for each said forming machine, each said set of troughs extending downwardly in a direction different from the other set of troughs from a point near the feeder to a position immediately above the mold cavities of its respective forming machine, each said set having*

*troughs corresponding in number to the numbers of cavities in its respective plural cavity blank mold of its respective machine, plural mold charge deflector scoops, said scoops being equal in number to said orifices and said cavities of the plural cavity blank molds and in spaced relation to each other with their upper ends spaced similarly to said orifices and with their lower ends spaced to cooperate with the upper ends of the troughs of each set, means for supporting said scoops in a position such that each scoop extends from beneath one of said orifices and is movable selectively into alignment with one of the troughs of a set of said troughs and such that said scoops vertically overlap one another when their longitudinal axes lie in the plane containing the axes of the orifices, the upper end of each said scoop being at all times in substantially coaxial alignment with and beneath its respectvie orifice, and means for oscillating said scoops in step-by-step fashion while maintaining the upper ends thereof in alignment with their respective orifices and*

*moving their lower ends to register their lower ends in predetermined order with the upper ends of said sets of troughs.*

References Cited

The following references, cited by the Examiner, are of record in the patented file of this patent or the original patent.

UNITED STATES PATENTS

| | | | |
|---|---|---|---|
| 2,041,671 | 5/1936 | Allen | 65—243 |
| 2,732,665 | 1/1956 | Cassell | 65—223 |
| 2,926,457 | 3/1960 | Trudeau | 65—223 |
| 3,147,102 | 9/1964 | Trudeau | 65—304 |
| 3,333,938 | 8/1967 | Zappia | 65—225 |
| 3,592,624 | 7/1971 | Dahms | 65—304 |

ARTHUR D. KELLOGG, Primary Examiner

U.S. Cl. X.R.

65—225; 193—23